(12) United States Patent
Noda et al.

(10) Patent No.: US 7,349,672 B2
(45) Date of Patent: Mar. 25, 2008

(54) DIGITAL SIGNAL TRANSCEIVER

(75) Inventors: Masaaki Noda, Gifu (JP); Osamu Asayama, Aichi (JP); Hiroshi Ando, Aichi (JP); Hideaki Ueda, Aichi (JP); Mitsuru Kaito, Gifu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 534 days.

(21) Appl. No.: 10/782,097

(22) Filed: Feb. 19, 2004

(65) Prior Publication Data

US 2004/0198418 A1   Oct. 7, 2004

(30) Foreign Application Priority Data

Feb. 25, 2003   (JP)   ............................ 2003-047306

(51) Int. Cl.
*H04B 1/38*   (2006.01)

(52) U.S. Cl. .............................. 455/73; 455/76; 455/78; 455/118; 455/84; 455/85; 455/86; 455/550.1

(58) Field of Classification Search ................. 455/73, 455/118, 550.1, 76, 78, 84–86
See application file for complete search history.

(56) References Cited

U.S. PATENT DOCUMENTS

| | | | | |
|---|---|---|---|---|
| 4,755,774 A | * | 7/1988 | Heck | 332/123 |
| 4,812,783 A | * | 3/1989 | Honjo et al. | 331/20 |
| 5,144,254 A | * | 9/1992 | Wilke | 327/107 |
| 5,428,824 A | * | 6/1995 | Kasai | 455/78 |
| 5,493,583 A | * | 2/1996 | Cripps | 375/219 |
| 5,533,056 A | * | 7/1996 | Cripps | 375/286 |
| 5,550,865 A | * | 8/1996 | Cripps | 375/295 |
| 5,793,819 A | * | 8/1998 | Kawabata | 375/344 |
| 5,825,813 A | * | 10/1998 | Na | 375/219 |
| 5,896,562 A | * | 4/1999 | Heinonen | 455/76 |
| 6,087,865 A | * | 7/2000 | Bradley | 327/117 |
| 6,091,303 A | * | 7/2000 | Dent | 331/2 |
| 6,157,821 A | * | 12/2000 | Boesch et al. | 455/260 |

(Continued)

FOREIGN PATENT DOCUMENTS

JP   06-284037 A   10/1994

OTHER PUBLICATIONS

Data sheet XE1202, Low-power, integrated UHF transceiver, by XEMICS, pp. 1-27.

*Primary Examiner*—Lana Le
*Assistant Examiner*—April S. Guzman
(74) *Attorney, Agent, or Firm*—RatnerPrestia

(57) ABSTRACT

A digital signal transceiver includes a frequency modulator for outputting a high-frequency signal frequency-modulated with a digital signal input thereto, a power amplifier, an antenna terminal, and an antenna switch. The antenna switch includes a first branch port for receiving a signal output from the power amplifier, a common port connected to the antenna terminal, said common port being connected to the first branch port in the transmitting mode, and a second branch port connected to the common port in the receiving mode. The transceiver further includes a filter having an input port thereof connected to the second branch port of the antenna switch, a high-frequency amplifier having an input port thereof connected to an output port of the filter, and a mixer for mixing a signal output from the high-frequency amplifier with the signal output from the frequency modulator.

15 Claims, 6 Drawing Sheets

U.S. PATENT DOCUMENTS

| | | |
|---|---|---|
| 6,226,499 B1 * | 5/2001 | Nakatani et al. ............. 455/78 |
| 6,294,936 B1 * | 9/2001 | Clementi .................... 327/156 |
| 6,345,173 B1 * | 2/2002 | Fourtet et al. ............... 455/76 |
| 6,351,485 B1 * | 2/2002 | Soe et al. ................... 375/130 |
| 6,374,086 B1 * | 4/2002 | Tolson ........................ 455/73 |
| 6,526,265 B1 * | 2/2003 | Damgaard et al. .......... 455/118 |
| 6,563,387 B2 * | 5/2003 | Hirano et al. ................ 331/11 |
| 6,564,039 B1 * | 5/2003 | Meador et al. .............. 455/76 |
| 6,606,005 B2 * | 8/2003 | Chang ......................... 331/78 |
| 6,639,475 B2 * | 10/2003 | Ichimaru ..................... 331/17 |
| 6,714,772 B2 * | 3/2004 | Kasahara et al. ........... 455/260 |
| 6,873,218 B2 * | 3/2005 | Khlat .......................... 332/103 |
| 7,043,202 B2 * | 5/2006 | Ozawa et al. ................ 455/23 |
| 7,079,616 B2 * | 7/2006 | Castiglione et al. ........ 375/376 |
| 2005/0124377 A1 * | 6/2005 | Shih et al. ............... 455/552.1 |

* cited by examiner

US 7,349,672 B2

DIGITAL SIGNAL TRANSCEIVER

FIELD OF THE INVENTION

The present invention relates to a digital signal transceiver for transmitting and receiving a signal modulated with a digital signal.

BACKGROUND OF THE INVENTION

FIG. 4 is a block diagram of a conventional digital transceiver including a receiving system 101 and a transmitting system 102.

The receiving system 101 includes an antenna terminal 42 connected to an antenna 41, an antenna switch 43 connected to the antenna terminal 42, a receiving filter 52 connected to a branch port 43a of the antenna switch 43, a high-frequency amplifier 53 connected to an output port of the receiving filter 52, a receiving mixer 54 having one input port connected to the output port of the high-frequency amplifier 53 and having the other input port connected to an output port of a phase locked-loop (PLL) oscillator 51, and an output terminal 55 connected to an output port of the receiving mixer 54. The PLL oscillator 51 is controlled with control data received through a control input port 51a.

The transmitting system 102 includes a modulator 47 having one input port connected to the output port of a transmitter modulation input terminal 49 and having another input port connected to an output port of a local oscillator 50, a transmitting mixer 46 having one input port connected to an output port of the modulator 47 and having another input port connected to the output port of the PLL oscillator 51, a transmitting filter 45 connected to an output port of the transmitting mixer 46, and a power amplifier 44 connected between an output port of the transmitting filter 45 and a branch port 43b of the antenna switch 43.

An operation the conventional transceiver 100 will be explained.

An operation of the receiving system 101 will be explained. A high-frequency signal is received by the antenna 41 and transferred to the antenna terminal 42. The high-frequency signal is then transferred via the antenna switch 43 to the receiving filter 52 for allowing a desired signal in the signal to pass through the filter. The desired signal is amplified by the high-frequency amplifier 53. The amplified signal is mixed with an output of the PLL oscillator 51 by the receiving mixer 54. A resultant intermediate frequency signal is then released from the output terminal 55.

An operation of the transmitting system 102 will be explained. A signal output from the local oscillator 50 is modulated by the modulator 47 with a digital signal received through the transmitter modulation input terminal 49. The modulated signal from the modulator 47 is mixed with an output of the PLL oscillator 51 by the transmitting mixer 46. An output of the transmitting mixer 46 is supplied to the transmitting filter 45. An output of the transmitting filter 45 is amplified by the power amplifier 44 and transferred to the branch port 43b of the antenna switch 43. The amplified signal received by the antenna switch 43 is then transmitted through the antenna 41.

The transmitting mixer 46 mixes the output of the modulator 47 with the output of the PLL oscillator 51, and outputs signal containing a high harmonic component. Such undesired harmonic component is then eliminated by the transmitting filter 45. The conventional digital signal transceiver 100 modulates the digital signal received through the transmitter demodulation input terminal 49, thus including a number of components including the transmitting filter 45, the transmitting mixer 46, and the modulator 47.

Japanese Patent Laid-Open Publication No. 6-284037 discloses a digital transceiver including a single oscillator commonly used as the local oscillator 50 and the PLL oscillator 51.

FIG. 5 is a block diagram of another conventional digital signal transceiver 103. The transceiver 103 includes an antenna terminal 42 connected to an antenna 41, an antenna switch 43 connected to the antenna terminal 42, a receiving filter 52 connected to a branch port 43a of the antenna switch 43, a high-frequency amplifier 53 connected to an output port of the receiving filter 52, a receiving mixer 54 having one input port connected to an output port of the high-frequency amplifier 53 and having another input port connected to an output port of a frequency modulator 61, and an output terminal 55 connected to an output port of the receiving mixer 54. The frequency modulator 61 is controlled with control data received through a control input port 61c.

The frequency modulator 61 receives a digital signal through a modulation input port 61b, receives control data through the input port 61c for controlling a PLL in the modulator and output a signal through the output port 61a. The signal output from the frequency modulator 61 is supplied to a power amplifier 44 having an output port connected to another branch port 43b of the antenna switch 43.

A high frequency signal is received through the antenna 41 and transferred to the antenna terminal 42. The high frequency signal is then transferred via the antenna switch 43 to the receiving filter 52 for allowing a desired signal in the high-frequency signal to pass through the filter. The desired signal is amplified by the high-frequency amplifier 53. The amplified signal is mixed with an output signal of the frequency modulator 61 by the receiving mixer 54. A resultant intermediate frequency signal is then output from the output terminal 55.

The frequency modulator 61 receives a digital signal through the modulation input port 61b, modulates a high-frequency signal with the digital signal, and outputs the frequency-modulated signal through the output port 61a.

SUMMARY OF THE INVENTION

A digital signal transceiver includes a frequency modulator for outputting a high-frequency signal frequency-modulated with a digital signal input thereto, a power amplifier for receiving a signal output from the frequency modulator, an antenna terminal arranged to be connected to an antenna, and an antenna switch. The antenna switch includes a first branch port for receiving a signal output from the power amplifier, a common port connected to the antenna terminal, said common port being connected to the first branch port in the transmitting mode, and a second branch port connected to the common port in the receiving mode. The transceiver further includes a filter having an input port thereof connected to the second branch port of the antenna switch, a high-frequency amplifier having an input port thereof connected to an output port of the filter, and a mixer for mixing a signal output from the high-frequency amplifier with the signal output from the frequency modulator to output a signal including the signal from the high-frequency amplifier and the signal from the frequency modulator. The frequency modulator outputs a high-frequency signal containing a phase noise in a transmitting mode different in level from a phase noise in a high-frequency signal in a receiving mode. The high-frequency signal in the receiving mode is not modulated.

The digital signal transceiver includes the single frequency modulator commonly used in a transmitting mode and in a receiving mode, hence including a reduced number of components and having a high performance for receiving signals.

DESCRIPTION OF THE PREFERRED EMBODIMENTS

According to experiments by an inventor, it was confirmed that a conventional digital signal transceiver shown in FIG. 5 had a problem described below.

Figure 5:
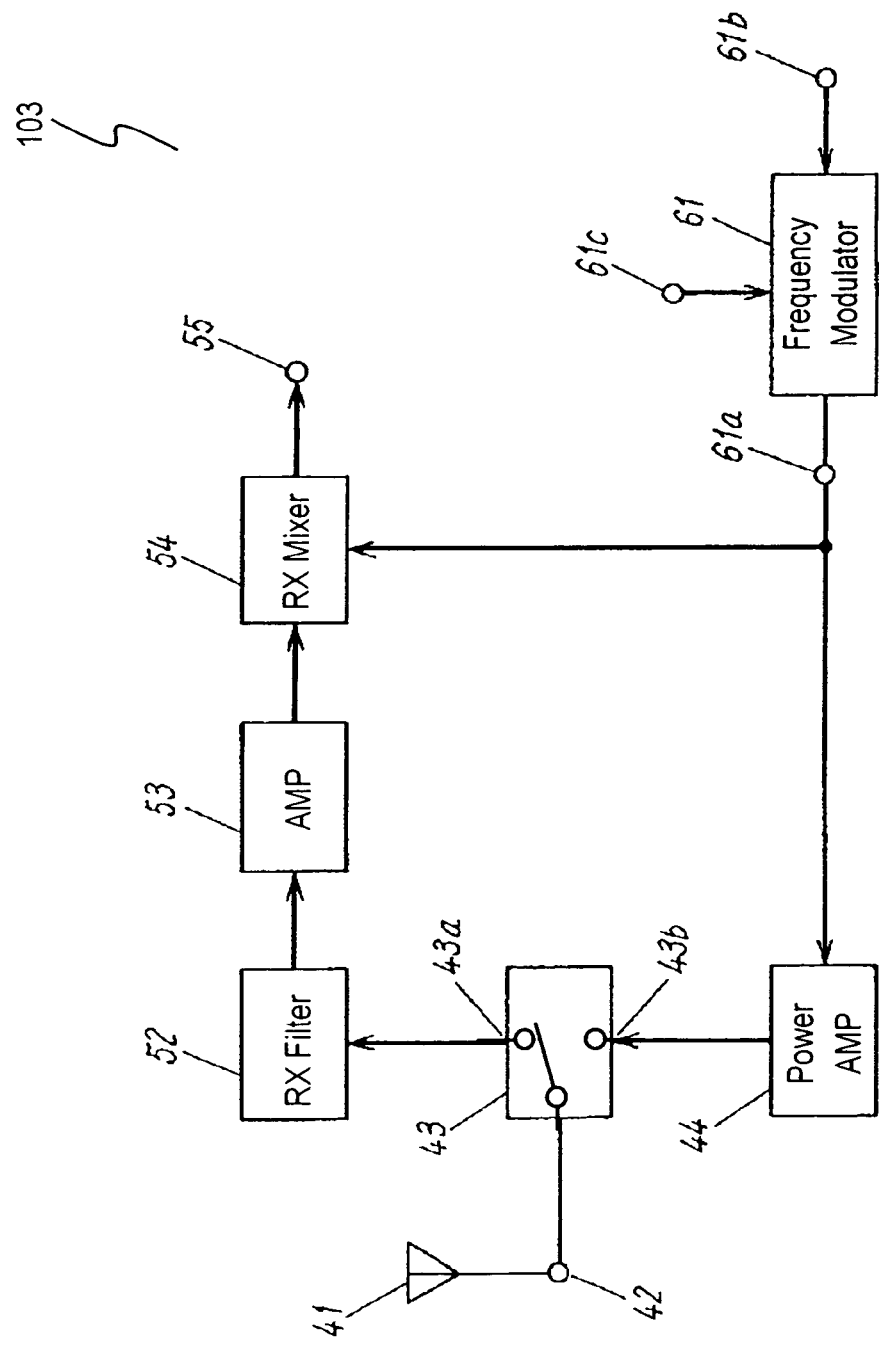
FIG. 5 is a block diagram of another conventional transceiver.
Figure 6:
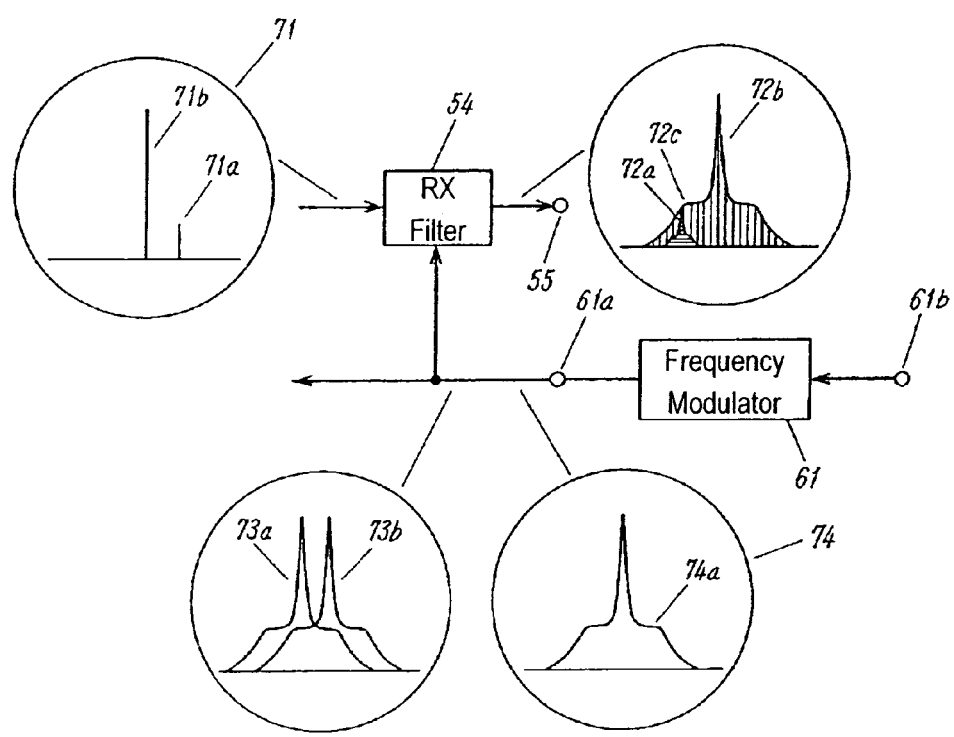
FIG. 6 illustrates signals in the digital signal transceiver shown in FIG. 5.

FIG. 6 illustrates signals in the conventional transceiver 103 shown in FIG. 5.

In the transceiver 103, in a transmitting mode, the frequency modulator 61 is required to operate at a high speed since outputting a signal modulated with the digital signal received through the modulation input port 61b. More specifically, the PLL in the frequency modulator 61 is required to respond quickly to the digital signal having a wide range of frequencies. For the quick response, the PLL has a large loop gain. When the loop gain of the PLL is large, the frequency modulator 61 may momentarily generates a phase noise in an oscillation signal, such as signals 73a and 73b, as shown in FIG. 6.

The signal 71 transferred from the antenna 41 and received by the receiving mixer 54 may contain a desired signal 71a and an interruption signal 71b which has a level larger than that of the signal 71a and has a frequency close to that of the desired signal 71a, thus causing a problem. The receiving mixer 54 mixes the desired signal 71a and the interruption signal 71b with a signal 74 output from the frequency modulator 61, thus generating and outputting a desired signal 72a and an interruption signal 72b. Since the desired signal 72a has a level smaller than that of the interruption signal 72b, the desired signal 72a may be disturbed by a phase noise 72c in the interruption signal 72b, thus being hardly separated from the signal output from of the receiving mixer 54.

To solve the problem in a receiving mode, the signal 74 output from the frequency modulator 61 needs to contain a phase noise 74a having a small level. In other words, respective frequency modulators for the transmitting mode and the receiving mode are required.

Figure 1:
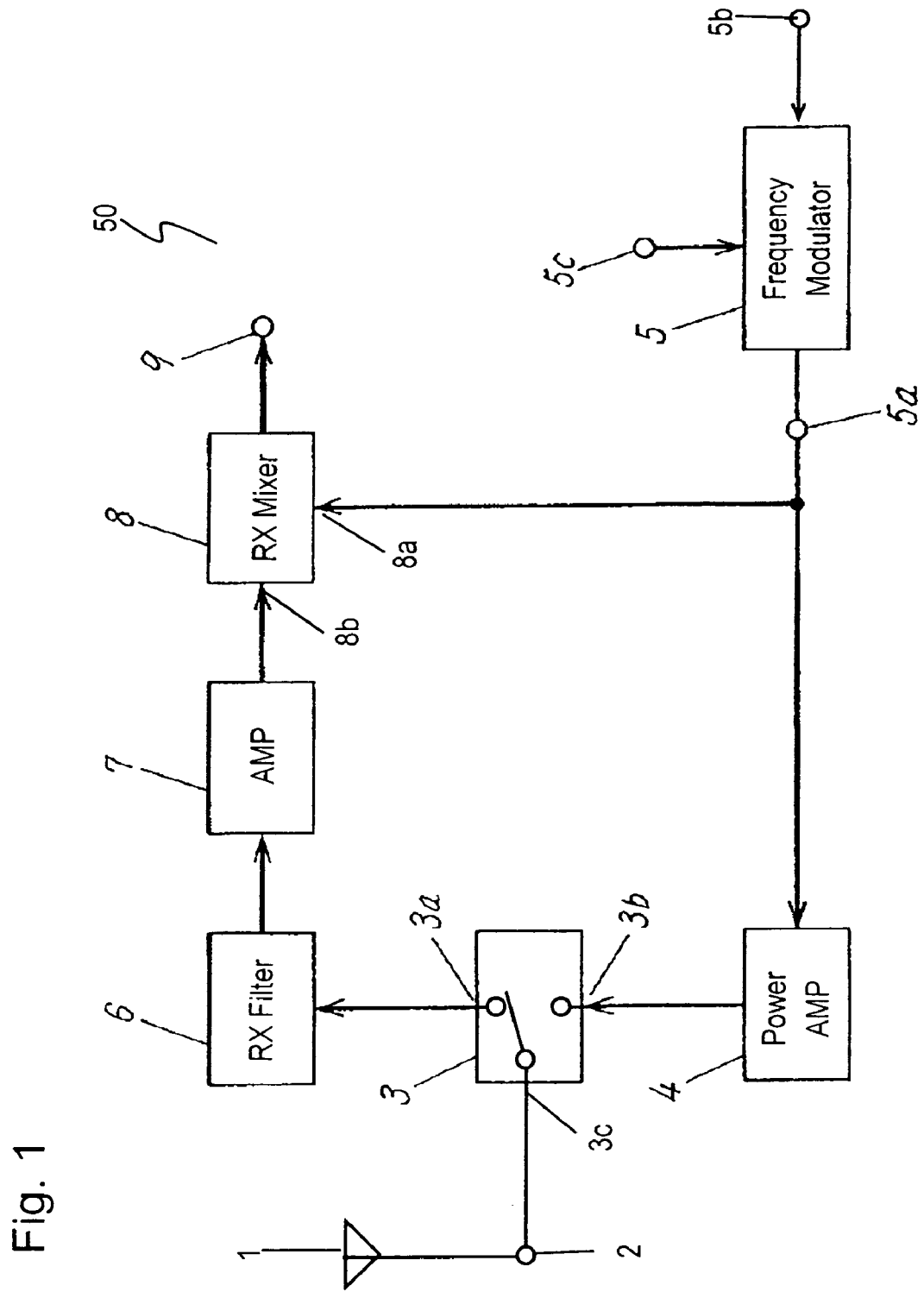
FIG. 1 is a block diagram of a digital signal transceiver according to an exemplary embodiment of the present invention.

FIG. 1 is a block diagram of a digital signal transceiver 50 according to an exemplary embodiment of the present invention. The transceiver 50 includes a frequency modulator 5, a power amplifier 4 connected to an output port 5a of the frequency modulator 5, an antenna switch 3 having one branch port 3b connected to an output port of the power amplifier 4, an antenna terminal 2 connected to a common port 3c of the antenna switch 3, a receiving filter 6 connected to another branch port 3a of the antenna switch 3, a high-frequency amplifier 7 connected to an output port of the receiving filter 6, a receiving mixer 8 having one input port 8b connected to an output port of the high-frequency amplifier 7, and an output terminal 9 connected to an output port of the receiver mixer 8. The receiving mixer 8 further has another input port 8a connected to an output port 5a of the frequency modulator 5. The frequency modulator 5 has a transmitting modulation input ports 5b for receiving a digital signal and an input port 5c for receiving a phase locked loop (PLL) control data. The frequency modulator 5 outputs a frequency-modulated signal which is modulated directly with the digital signal received through the input port 5b has a frequency determined by the PLL control data received through the input port 5c. The output signal of the frequency modulator 5 includes a phase noise changeable between a transmitting mode and a receiving mode.

An operation of the digital signal transceiver 50 will be described.

An operation in the receiving mode will be explained first. In the antenna switch 3, the branch port 3a is connected to the common port 3c. Then, a high frequency signal received at the antenna 1 is transferred via the branch port 3a of the antenna switch 3 to the receiving filter 6 for allowing a desired signal to pass and for suppressing signals having frequencies out of a receiving frequency band. The desired signal output from the receiving filter 6 is then amplified by the high-frequency amplifier 7 and transferred to the receiving mixer 8.

The frequency modulator 5 outputs, from the output port 5a, a single frequency signal, i.e., an oscillation signal which is not modulated. The oscillation signal is supplied to the input port 8a of the receiving mixer 8. Then, an intermediate frequency signal is output from the output port 9 of the receiving mixer 8.

An operation in the transmitting mode will be explained. In the antenna switch 3, the branch port 3b is connected to the common port 3c. The frequency modulator 5 frequency-modulates an oscillation signal directly with a digital signal received through the transmitter modulation input port 5b, and outputs the modulated signal through the output port 5a. The modulated signal from the output port 5a is amplified to a predetermined power level by the power amplifier 4, and is transferred through the branch port 3b of the antenna switch 3 and the antenna terminal 2, then being transmitted from the antenna 1.

The antenna switch 3 and the frequency modulator 5 are switched between the transmitting mode and the receiving mode. More specifically, in the receiving mode, the antenna switch 3 is connected between the branch port 3a and the common port 3c, and substantially simultaneously to this, the frequency modulator 5 is switched to a single frequency mode for outputting the oscillation signal which is not modulated from the output port 5a. In the transmitting mode, the antenna switch 3 has the branch port 3b connected to the common port 3c, while the frequency modulator 5 is switched to a modulation mode for outputting, from the output port 5a, a frequency-modulated signal which has been modulated with the digital signal received through the input port 5b.

As described, the signal transceiver 50 of the embodiment has a small size since including the frequency modulator 5 is used commonly as the frequency modulator in the transmitting mode and an oscillator for the receiving mixer in the receiving mode.

Figure 2:
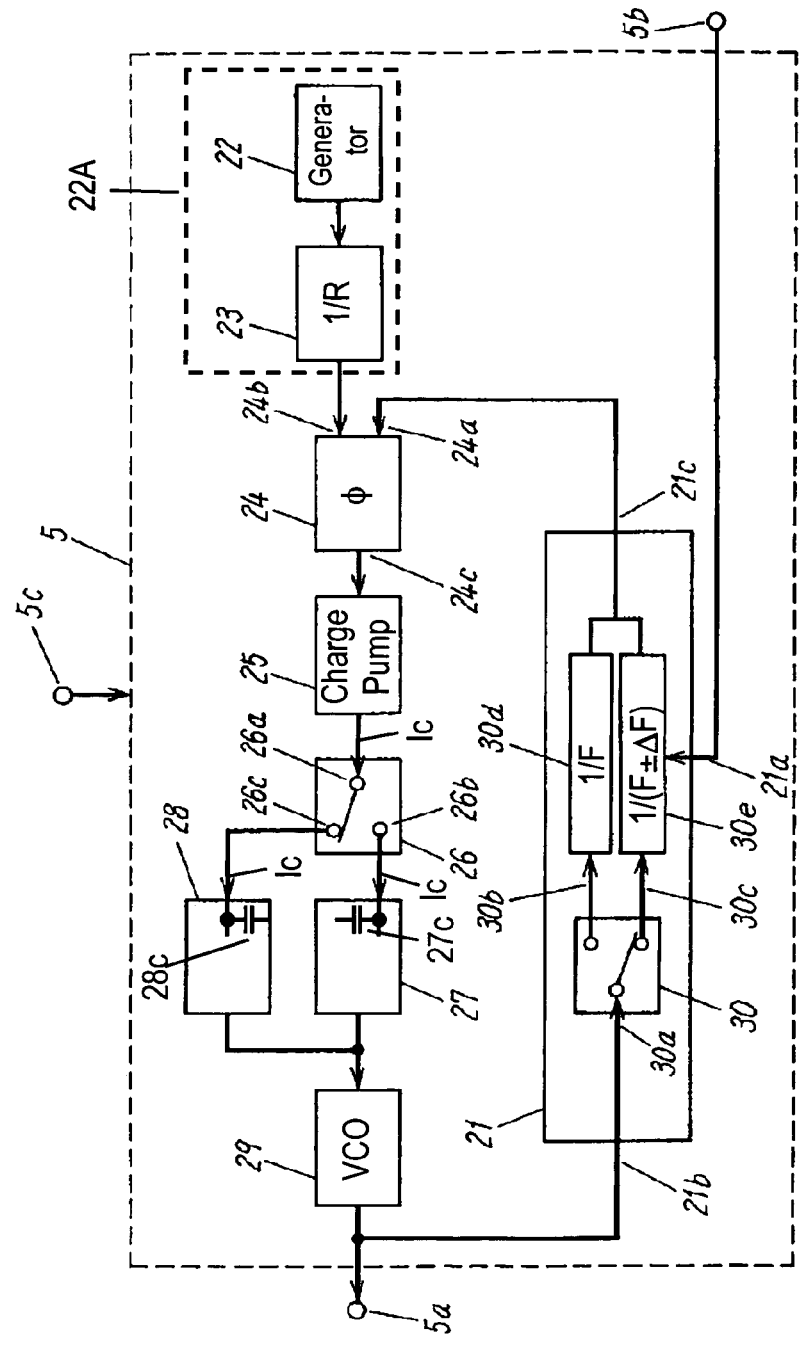
FIG. 2 is a block diagram of a frequency modulator in the transceiver according to the embodiment.

FIG. 2 is a block diagram of the frequency modulator 5 in the digital signal transceiver 50 of the embodiment. The frequency modulator 5 includes a PLL circuit. A frequency divider 21 has an input port 21 for receiving the digital signal from the transmitter modulation input port 5a. A phase comparator 24 has an input port 24a for receiving a signal from the output port 21c and has another input port 24b for receiving a signal generated by a reference signal generator 22 and transferred through the frequency divider 23. The reference signal generator 22 and the frequency divider 23 forms a reference-signal generating unit 22A. A charge pump 25 receives a signal from an output port 24c of the phase comparator 24. A switch 26 of electron type has a common port 26a connected to the output of the charge pump 25. The switch 26 has one branch port 26b connected to a low-pass filter (LPF) 27. Another branch port 26c of the switch 26 is connected to an LPF 28. Respective output ports of the LPFs 27 and 28 are connected to a voltage-controlled oscillator (VCO) 29, a variable-frequency oscillator. An output of the VCO 29 is connected to the output port 5a for outputting the modulated signal. The frequency modulator 5 includes a data input port 5c for receiving PLL controlling data. More particularly, the output of the VCO 29 is connected to another input port 21b of the frequency divider 21. The VCO 29 is controlled with the PLL controlling data from the data input port 5c.

An operation of the frequency modulator 5 will be described.

First, an operation in the receiving mode will be explained. In the switch 30, the common port 30a is connected to the branch port 30b. Even when a high-frequency signal received at the antenna 1 contains a desired signal and an interruption signal close to the desired signal, in the receiving mode, VCO 29 outputs a signal containing a phase noise having a small level for reducing an influence of the interruption signal. A signal of frequency f(VCO) output from the output port 5a of the VCO 29 is supplied to the input port 21b of the frequency divider 21. The signal supplied to the input port 21b is transferred via the common port 30a to the branch port 30b of the switch 30, and frequency-divided by a rate of 1/F in a receiving-frequency divider 30d. A signal output from the receiving-frequency divider 30d is supplied to the input port 24a of the phase comparator 24. More specifically, the signal of a frequency f(VCO)/F output from the output port 21c of the frequency divider 21 is supplied to the input port 24a of the phase comparator 24.

A signal of a reference frequency f(REF1) output from the reference-signal generator 22 is divided by a dividing rate 1/R in the frequency divider 23 and is output as a reference signal for phase comparison having a frequency f(REF1)/R. The signal output from the frequency divider 23 is supplied to the input port 24b of the phase comparator 24. Then, the frequency modulator 5 outputs the signal which is not modulated and is not changed according to the digital signal from the output port 5a in the receiving mode.

A signal output from the phase comparator 24 is input to the charge pump 25. The charge pump 25 outputs a current Ic to the common port 26a of the switch 26 of electron type in response to the output of the phase comparator 24. In the receiving mode, the switch 26 has the common port 26a connected to the branch port 26c. Then, the current Ic output from the charge pump 25 is supplied via the branch port 26c of the switch 26 to the LPF 28 having a low cut-off frequency. LPF 28 includes a capacitor 28c which is charged and discharged with the current Ic. The LPF 28 outputs an averaged voltage between both ends of the capacitor 28c which is charged and discharged with the current Ic. The signal output from the LPF 28 controls the VCO 29 to output a signal having a oscillation frequency f(VCO) such that the frequency f(VCO) is a predetermined frequency. The predetermined frequency is determined by the PLL controlling data received at the data input port 5c.

The phase comparator 24 compares in phase between a signal of a frequency f(VCO)/F received at the input port 24a and a signal of a frequency f(REF1)/R received at the input port 24b for PLL controlling. When the signals matches with each other in phase by the PLL controlling, the following equation is established.

$$F(VCO)/F=f(REF1)/R \quad \text{(Equation 1)}$$

The frequency f(VCO) of the VCO 29 is then determined as:

$$f(VCO)=F \times f(REF1)/R \quad \text{(Equation 2)}$$

In the signal transceiver 50 of the embodiment, when a signal of 915 MHz is received, the reference frequency f(REF1) of the reference-signal generator 22 is set to 16.8 MHz, the dividing rate 1/R of the frequency divider 23 is set to "1", and the dividing rate 1/F of the receiving-frequency divider 30d is set to 1/62.2045. Accordingly, the oscillating frequency f(VCO) of the VCO 29 is 1045.0356 MHz according to Equation 1.

An operation in the transmitting mode will be described. In the transmitting mode, the digital signal received at the transmitter modulation input port 5b is transferred to the input port 21a of the frequency divider 21, and the following four operations are executed.

(1) In the switch 30 in the frequency divider 21, the common port 30a is connected to the branch port 30c, and a signal output from the VCO 29 is transferred from the common port 30a via the branch port 30c to the transmitting-frequency divider 30e. The digital signal received at the transmitter modulation input port 5b consists of data "0" and "1", and the transmitting-frequency divider 30e has a dividing rate 1/(F-$\Delta$F) for the data "0" and has a dividing rate 1/(F+$\Delta$F) for the data "1". A signal output from the frequency divider 30e is supplied to the input port 24a of the phase comparator 24 for PLL-control the signal to determine the oscillation frequency of the VCO 29. In response to the digital signal received at the transmitter modulation input port 5b, the oscillation frequency of the VCO 29 is changed, that is, frequency-modified, and output from the output port 5a.

(2) In the switch 26, the common port 26a is connected to the branch port 26b. Then, the LPF 27 having a cut-off frequency higher than that of the LPF 28 receives the current Ic output from the charge pump 25. Accordingly, the PLL control is performed quickly according to the digital signal having the wide frequency width.

(3) The current Ic supplied to a capacitor 27c of the LPF 27c is set to a level greater than that in the receiving mode. Then, the PLL control is locked quickly accordingly and responds very quickly. Accordingly, the PLL control is performed according to the digital signal having a wide frequency width. LPF 27 outputs an averaged voltage generated between both ends of the capacitor 27c which is charged and discharged with the current Ic.

(4) The frequency divider 23 has the dividing rate 1/R, in which the "R" is determined to be larger than that in the receiving mode. Then, the reference signal for phase comparison output from the frequency divider 23 is compared in phase with a signal having a frequency lower than that in the receiving mode. Accordingly, a minimum frequency range by which a transition frequency is changed according to one bit of the data of the digital input signal, i.e., a minimum step frequency can be narrow, hence allowing a frequency deviation to be determined accurately.

The operation of the frequency modulator 5 will be described in more detail.

The signal output from the transmitting-frequency divider 30e is supplied to the input port 24a of the phase comparator 24. Respective input signals received at the input ports 24a and 24b are then compared in phase by the phase comparator 24. When the signals match in phase with each other, similarly to Equation 1, the oscillation frequency f(VCO) of the VCO 29 is determined as the following equation:

$$f(VCO)/(F \pm \Delta F) = f(REF1)/R \quad \text{(Equation 3)}$$

The oscillation frequency f(VCO) of the VCO 29 is calculated as:

$$f(VCO) = (F \pm \Delta F) \times f(REF1)/R \quad \text{(Equation 4)}$$

The frequency deviation f(dev) of the frequency modulation is expressed as:

$$f(dev) = \Delta F \times f(REF1)/R \quad \text{(Equation 5)}$$

The oscillation frequency f(VCO) of the VCO 29 is modulated by the frequency transition f(dev) with the digital signal which is received through the transmitter modulation input port 5b and consists of data "0" and "1".

The minimum step frequency f(step) in the frequency deviation f(dev) is expressed by:

$$f(step) = f(REF1)/R \times (\tfrac{1}{2}^n) \quad \text{(Equation 6)}$$

In the Equation 6, the "n" in Equation 6 is determined by the control data received at the data input port 5c. For example, the "n" may be set to "12". When the "n" is large, the minimum step frequency f(step) becomes narrow.

The frequency deviation f(dev) is calculated by:

$$f(dev) = f(step) \times m \quad \text{(Equation 7)}$$
$$= f(REF1)/R \times (m/2^n)$$

The "m" is determined by the PLL control data received at the data input port 5c. The "m" is a natural number ranging, for example, from "1" to "127".

Equation 5 and Equation 7 provide the following equation.

$$\Delta F = m/2^n \quad \text{(Equation 8)}$$

A change ΔF of the frequency dividing rate of the frequency divider 30e is proportional to "m" and inversely proportional to "2^n". When the "n" is large, the change ΔF of the frequency dividing rate of the frequency divider 30e becomes small. The change ΔF can thus be set to a desired value by optimizing the "m". Accordingly, the frequency deviation f(dev) can be determined precisely, while the change ΔF is set to a predetermined value.

An operation for setting the frequency modulator 5 in the transmitting mode and the receiving mode will be described.

First, an operation in the receiving mode will be explained. In the receiving mode, the phase noise in the signal output from the frequency modulator 5 is reduced by setting the charge/discharge current Ic of the charge pump 25 to a level (e.g. 0.3 mA) smaller than that in the transmitting mode. Then, the phase noise is further reduced by the LPF 28 having the low cut-off frequency, substantially 0.49 MHz. The phase noise is further reduced by decreasing "R" of the dividing rate 1/R of the frequency divider 23. The rate determines the frequency f(REF2) of the reference signal received at the input port 24b of the phase comparator 24, thus setting the frequency f(REF2) (for example, 16.8 MHz) to higher.

According to the reducing of the phase noise, the signal transceiver 50 of the embodiment can receive a desired signal well even when receiving a high-frequency signal containing a large interruption signal close to the desired signal. The reduction of the charge/discharge current Ic of the charge pump 25, the increase of the phase comparing frequency f(REF2), and the lowering a cut-off frequency of the LPF 28 exhibit such advantage smaller in this order. That is, the reduction of the charge/discharge current Ic of the charge pump 25 contributes most to the reduction of the phase noise.

Then, the setting of the frequency modulator 5 in the transmitting mode will be described. In the transmitting mode, the frequency modulator 5 PLL-responds quickly by setting the charge/discharge current Ic (e.g. 2 mA) of the charge pump 25 to a level larger than that in the receiving mode. In the switch 26, the common port 26a is connected to the branch port 26b, and the signal output from the charge pump 25 is supplied to the LPF 27 having a cut-off frequency (e.g. 3.7 MHz) higher than that of the LPF 28. Then, the LPF passes the digital signal having a wide frequency range for a quick response.

The "R" of the dividing rate 1/R of the frequency divider 23 is set to "3". The frequency f(REF2) of the reference signal for phase comparison to be received at the input port 24b of the phase comparator 24 is set to a frequency (for example, 5.6 MHz) lower than that in the receiving mode. The "n" is set to "12". Accordingly the minimum step frequency f(step) becomes 1.367 kHz according to Equation 6. The frequency deviation f(dev) hence becomes 5.47 kHz according to Equation 7.

The rate of the frequency deviation to the oscillation frequency of the VCO 29, f(dev)/f(VCO) becomes 5.98 ppm. This rate may vary according to the oscillation frequency, the frequency of the digital signal, and thermal properties and deterioration with time of a crystal oscillator of the reference-signal generator 22. Even if the rate is different between the transmitting mode and the receiving mode, the dividing rate 1/R of the frequency divider 23, the "n" for determining the minimum step frequency f(step), and the "m" for determining the frequency deviation f(dev) can be determined to optimum levels with the PLL control data received at the PLL data input port 5c, hence determining the frequency deviation accurately.

As set forth above, the signal output from the VCO 29 contains a small phase noise in the receiving mode, and the frequency deviation is set accurately to an optimum level for the quick PLL response in the transmitting mode.

Figure 3:
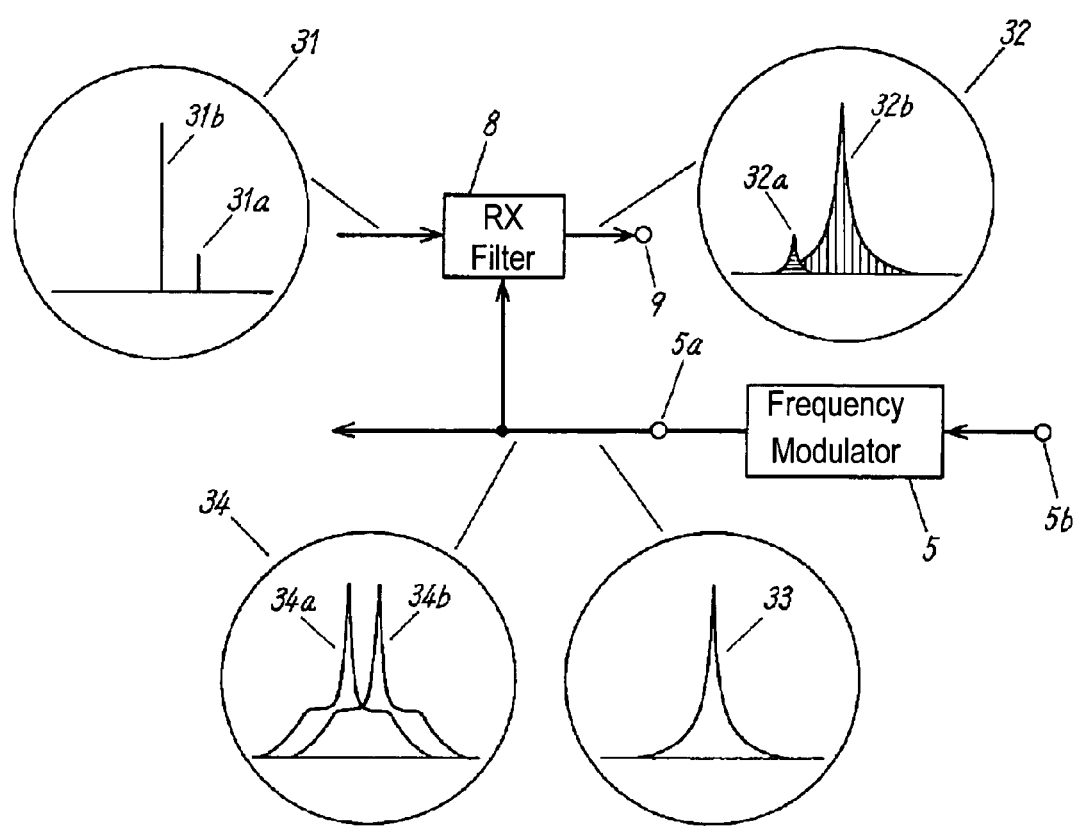
FIG. 3 illustrates signals in the transceiver according to the embodiment.
Figure 4:
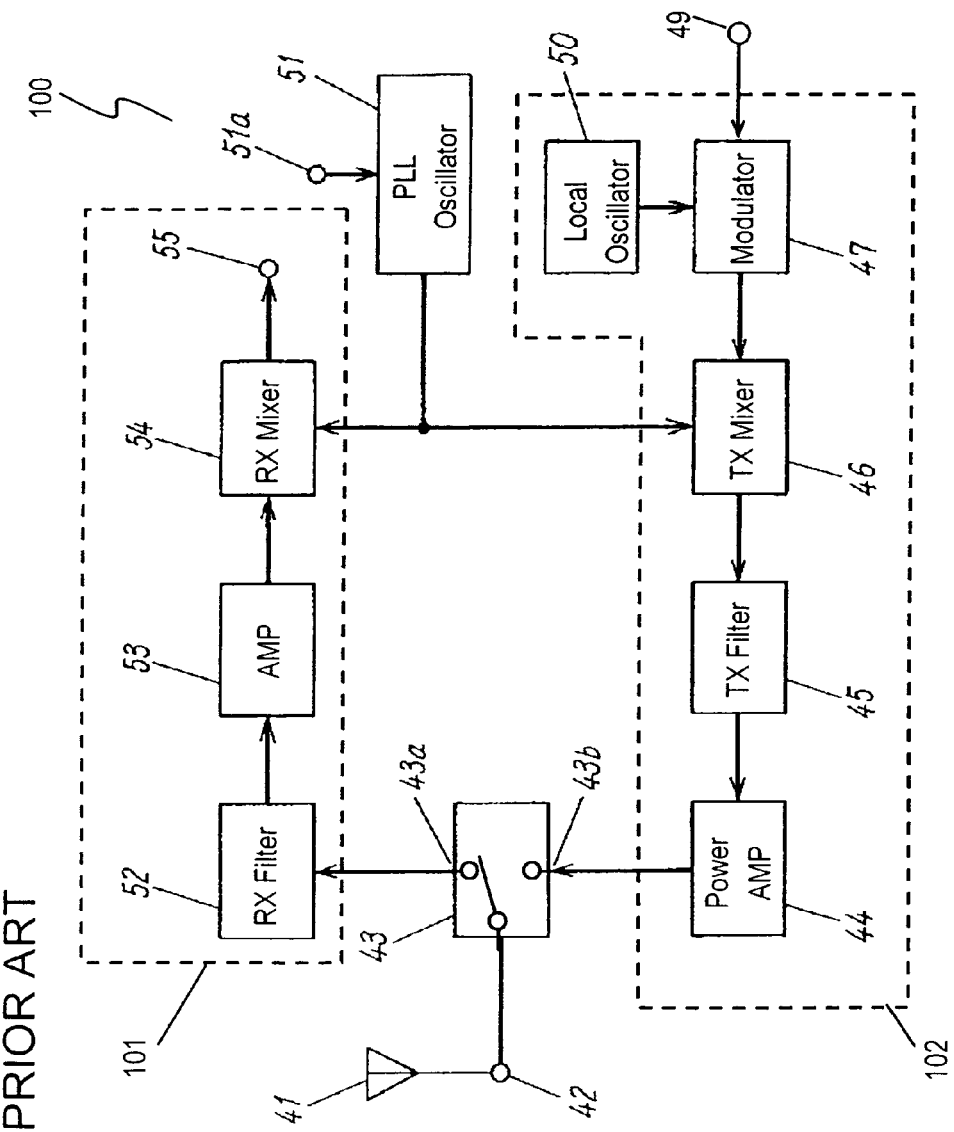
FIG. 4 is a block diagram of a conventional digital signal transceiver.

FIG. 3 illustrates signals in the signal transceiver 50 according to the embodiment.

First, signals in the receiving mode will be explained. An input signal 31 is received at the input port 8a of the receiving mixer 8. A signal 33 output from the frequency modulator 5 is supplied to the input port 8b of the mixer 8. The receiving mixer 8 outputs a signal 32 from the output port 9.

When the input signal 31 contains a desired signal 31a and an interruption signal 31b which is close to the desired signal 31a and has a level larger than the desired signal 31a, the receiving mixer 8 outputs a signal 32. The output signal 32 contains a desired signal 32a and an interruption signal 32b close to the desired signal 32a. A signal 33 output from the frequency modulator 5 and supplied to the input port 8b of the receiving mixer 8 contains a small phase noise, as shown in FIG. 3. Therefore, the interruption signal 32b derived from the signal 31b is attenuated at the frequency of the desired signal 32a. Accordingly, the desired signal 32a is easily separated from the interruption signal 32b in the signal output from the output terminal 9 before being processed (reproduced), thus providing a signal transceiver having a high performance of receiving signals.

Then, signals in the transmitting mode will be explained. A digital signal is received at the transmitter modulation input port 5b of the frequency modulator 5. The frequency modulator 5 outputs a transmission output signal 34 containing signals 34a and 34b. The signal 34a is a transmission output signal from the frequency modulator 5 when the transmitter modulation input port 5b receives the data of "0". When the transmitter modulation input port 5b receives the data of "1", the frequency modulator 5 outputs the signal 34b shifting by a frequency transition 2×f(dev) from the signal 34a. Upon receiving the data of "0" and "1" in sequence, the frequency modulator 5 outputs the transmission signal components 34a and 34b in sequence, respectively. The signal output from the frequency modulator 5 is then amplified by the power amplifier 4, transferred through the antenna switch 3, and transmitted from the antenna 1.

The signal transceiver 50 according to the embodiment executes all the operations (1) to (4). However, at least one of the operations (2) and (3) allows the frequency modulator to output signals containing the phase noise having levels different between the transmitting mode and the receiving mode, thus providing the same effect as of the signal transceiver 50.

What is claimed is:

1. A digital signal transceiver comprising:
  a frequency modulator for outputting a modulated signaling a transmitting mode, and for outputting a non-modulated signal in a receiving mode, said frequency modulator comprising:
  a variable frequency oscillator and
  a first frequency divider unit that switches between a modulating frequency divider and a non-modulating frequency divider, the non-modulating frequency divider receiving a signal output from the variable frequency oscillator and outputting a non-modulated signal, and the modulating frequency divider receiving the signal output from the variable frequency oscillator and a modulating signal and outputting the modulated signal;
  a power amplifier for receiving the modulated signal output from the frequency modulator;
  an antenna terminal arranged to be connected to an antenna;
  an antenna switch comprising
  a first branch port for receiving a signal output from the power amplifier,
  a common port connected to the antenna terminal, said common port being connected to the first branch port in the transmitting mode, and
  a second branch port connected to the common port in the receiving mode;
  a filter having an input port thereof connected to the second branch port of the antenna switch;
  a high-frequency amplifier having an input port thereof connected to an output port of the filter; and
  a mixer for mixing a signal output from the high-frequency amplifier with the signal output from the frequency modulator to output a signal including the signal from the high-frequency amplifier and the signal from the frequency modulator.

2. The digital signal transceiver according to claim 1,
  wherein the signal output from the variable frequency oscillator has a frequency varying according to a signal input thereto, and
  wherein the frequency modulator further comprises
  a reference signal generating unit for generating a first reference signal,
  a phase comparator for comparing a signal output from the first frequency divider unit with the first reference signal in phase, and
  a low-pass filter having an input port thereof connected to an output port of the phase comparator, said low-pass filter outputting the signal input to the variable-frequency oscillator.

3. The digital signal transceiver according to claim 2, wherein a frequency of the first reference signal in the transmitting mode is higher than a frequency of the first reference signal in the receiving mode.

4. The digital signal transceiver according to claim 2, wherein the reference-signal generating unit comprises
  a reference signal generator for generating a second reference signal, and
  a second frequency divider unit for outputting the first reference signal by frequency-dividing the second signal by a first dividing rate in the receiving mode, and by frequency-dividing the high-frequency signal by a second dividing rate larger than the first dividing rate in the transmitting mode.

5. The digital signal transceiver according to claim 2,
  wherein the variable frequency oscillator comprises a voltage-controlled oscillator for outputting a signal having a frequency varying according to a voltage input thereto, and
  wherein the frequency modulator further comprises a charge pump for receiving the signal output from the phase comparator and for supplying a first current to the low-pass filter in the transmitting mode and a second current larger than the first current in the receiving mode to the low-pass filter according to the signal output from the phase comparator.

6. The digital signal transceiver according to claim 2, wherein the low-pass filter has a cut off frequency in the transmitting mode higher than a cut-off frequency in the receiving mode.

7. The digital signal transceiver according to claim 1, wherein a phase noise in the non-modulated signal has a level different from a level of a phase noise in the modulated signal.

8. The digital signal transceiver, according to claim 7, wherein the level of the phase noise in the modulated signal Is larger than the level of the phase noise in the non-modulated signal.

9. A digital signal transceiver comprising:
  a frequency modulator for outputting a modulated signal in a transmitting mode, and for outputting a non-modulated signal in a receiving mode, said frequency modulator comprising:
  a reference signal generating unit for generating a first reference signal having a frequency in the transmitting mode lower than a frequency in the receiving mode, a variable-frequency oscillator for outputting a signal having a frequency varying according to a signal input thereto, a first frequency divider unit that switches between a modulating frequency divider and a non-modulating frequency divider, the non-modulating frequency divider receiving a signal output from the variable frequency oscillator and outputting a non-modulated signal, and the modulating frequency divider receiving the signal output from the variable frequency oscillator and a modulating signal and outputting a modulated signal, a phase comparator for comparing one of the modulated signal or the non-modulated signal output from the first frequency divider unit with the first reference signal in phase, and a low-pass filter having an input port thereof connected to an output port of the phase comparator, said low-pass filter outputting the signal input to the variable-frequency oscillator;

a power amplifier for receiving a signal output from the frequency modulator;

an antenna terminal arranged to be connected to an antenna;

an antenna switch including a first branch port for receiving a signal output from the power amplifier, a common port connected to the antenna terminal, the common port being connected to the first branch port in the transmitting mode, and a second branch port connected to the common port in the receiving mode;

a filter having an input port thereof connected to the second branch port of the antenna switch;

a high-frequency amplifier having an input port thereof connected to an output port of the filter; and a mixer for mixing a signal output from the high-frequency amplifier with the signal output from the frequency modulator to output a signal including the signal from the high-frequency amplifier and the signal from the frequency modulator.

10. The digital signal transceiver according to claim 9, wherein the reference signal generating unit comprises a reference signal generator for generating a second reference signal, and a second frequency divider for outputting the first reference signal by frequency-dividing the second reference by a first dividing rate in the receiving mode, and by frequency-dividing the high-frequency signal by a second dividing rate larger than the first dividing rate in the transmitting mode.

11. The digital signal transceiver according to claim 9, wherein the variable frequency oscillator comprises a voltage-controlled oscillator for outputting a signal having a frequency varying according to a voltage input thereto, and wherein the frequency modulator further comprises a charge pump for receiving the signal output from the phase comparator and for supplying a first current to the low-pass filter in the transmitting mode and a second current larger than the first current according to the signal output from the phase comparator.

12. The digital signal transceiver according to claim 9, wherein the low-pass filter has a cut off frequency in the transmitting mode higher than a cut-off frequency in the receiving mode.

13. A digital signal transmitting and receiving apparatus comprising:

a frequency modulator for outputting a modulated signal in a transmitting mode, and for outputting a non-modulated signal in a receiving mode, the frequency modulator comprising:

a reference signal generating unit for generating a reference signal, a voltage-controlled oscillator for outputting one of the modulated signal or the non-modulated signal having a frequency varying according to a voltage input thereto, a frequency divider unit that switches between a modulating frequency divider and a non-modulating frequency divider, the non-modulating frequency divider receiving a signal output from the voltage-controlled oscillator and outputting a non-modulated signal, and the modulating frequency divider receiving the signal output from the voltage-controlled oscillator and a modulating signal and outputting the modulated signal, a phase comparator for comparing one of the modulated signal or the non-modulated signal output from the frequency divider unit with the reference signal in phase, a charge pump for receiving the signal output from the phase comparator and for outputting a first current in the transmitting mode and a second current in the receiving mode according to the signal output from the phase comparator, a low-pass filter receiving the first and second currents and outputting the signal input to the voltage-controlled oscillator, a power amplifier for receiving an output signal from the frequency modulator;

an antenna terminal arranged to be connected to an antenna;

an antenna switch comprising a first branch port for receiving a signal output from the power amplifier, a common port connected to the antenna terminal, the common port being connected to the first branch port in the transmitting mode, and a second branch port connected to the common port in the receiving mode;

a filter having an input port thereof to the second branch port of the antenna switch;

a high-frequency amplifier having an input port thereof to an output port of the filter; and a mixer for mixing a signal output from the high-frequency amplifier with the signal output from the frequency modulator to output a signal including the signal from the high-frequency amplifier and the signal from the frequency modulator.

14. The digital signal transmitting and receiving apparatus according to claim 13, wherein the low-pass filter has a cut off frequency in the transmitting mode higher than a cut-off frequency in the receiving mode.

15. A digital signal transmitting and receiving apparatus comprising:

a frequency modulator for outputting a modulated signal in a transmitting mode, and for outputting a non-modulated signal in a receiving mode, the frequency modulator comprising:

a reference signal generating unit for generating a reference signal, a variable-frequency oscillator for outputting a signal having a frequency varying according to a signal input thereto, a frequency divider unit that switches between a modulating frequency divider and a non-modulating frequency divider, the non-modulating frequency divider receiving a signal output from the variable frequency oscillator and outputting the non-modulated signal, and the modulating frequency divider receiving the signal output from the variable frequency oscillator and a modulating signal and outputting the modulated signal, a phase comparator for comparing one of the modulated signal or the non-modulated signal output from the first frequency divider unit with the reference signal in phase, and a low-pass filter having an Input port thereof connected to an output port of the phase comparator, said low-pass filter outputting the signal input to the variable-frequency oscillator, the low-pass filter having a cut off frequency in the transmitting mode higher than a cut-off frequency in the receiving mode;

a power amplifier for receiving a signal output from the frequency modulator;

an antenna terminal arranged to be connected to an antenna;

an antenna switch comprising a first branch port for receiving a signal output from the power amplifier, a common port connected to the antenna terminal, the common port being connected to the first branch port in the transmitting mode, and a second branch port connected to the common port in the receiving mode;

a filter having an input port thereof connected to the second branch port of the antenna switch;

a high-frequency amplifier having an Input port thereof connected to an output port of the filter; and a mixer for mixing a signal output from the high-frequency amplifier with the signal output from the frequency modulator to output a signal including the signal from the high-frequency amplifier and the signal from the frequency modulator.

* * * * *

UNITED STATES PATENT AND TRADEMARK OFFICE
CERTIFICATE OF CORRECTION

PATENT NO. : 7,349,672 B2 Page 1 of 1
APPLICATION NO. : 10/782097
DATED : March 25, 2008
INVENTOR(S) : Masaaki Noda et al.

It is certified that error appears in the above-identified patent and that said Letters Patent is hereby corrected as shown below:

At Column 9, lines 38-39, claim 1 of the Letters Patent, in claim 1, "signaling a transmitting" should read --signal in a transmitting--

Signed and Sealed this

Twenty-ninth Day of July, 2008

JON W. DUDAS
*Director of the United States Patent and Trademark Office*